(12) United States Patent
Metaxas et al.

(10) Patent No.: US 9,519,964 B2
(45) Date of Patent: *Dec. 13, 2016

(54) SYSTEM AND METHOD FOR GENERATING THREE-DIMENSIONAL IMAGES FROM TWO-DIMENSIONAL BIOLUMINESCENCE IMAGES AND VISUALIZING TUMOR SHAPES AND LOCATIONS

(75) Inventors: Dimitris Metaxas, North Brunswick, NJ (US); Debabrata Banerjee, Bellerose, NY (US); Xiaolei Huang, Bethlehem, PA (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 1064 days.

This patent is subject to a terminal disclaimer.

(21) Appl. No.: 13/545,672

(22) Filed: Jul. 10, 2012

(65) Prior Publication Data

US 2013/0070992 A1 Mar. 21, 2013

Related U.S. Application Data

(63) Continuation of application No. 12/065,980, filed as application No. PCT/US2006/034320 on Aug. 31, 2006, now Pat. No. 8,218,836.

(Continued)

(51) Int. Cl.
 *G06K 9/00* (2006.01)
 *G06T 7/00* (2006.01)
(52) U.S. Cl.
 CPC .......... *G06T 7/0012* (2013.01); *G06T 7/0075* (2013.01)
(58) Field of Classification Search
 CPC combination set(s) only.
 See application file for complete search history.

(56) References Cited

U.S. PATENT DOCUMENTS 6,760,488 B1 * 7/2004 Moura ................. G06T 7/0071
 345/419
7,742,629 B2 * 6/2010 Zarkh .................. G06T 7/0067
 345/419

(Continued)

FOREIGN PATENT DOCUMENTS

WO  WO 2007/032940  3/2007

OTHER PUBLICATIONS

Office Action dated Oct. 20, 2011, from U.S. Appl. No. 12/065,980 (10 pages).

(Continued)

*Primary Examiner* — Anand Bhatnagar
(74) *Attorney, Agent, or Firm* — McCarter & English, LLP

(57) ABSTRACT

A system and methods for generating 3D images from 2D bioluminescent images and visualizing tumor locations are provided. A plurality of 2D bioluminescent images of a subject are acquired using any suitable bioluminescent imaging system. The 2D images are registered to align each image and to compensate for differences between adjacent images. After registration, corresponding features are identified between consecutive sets of 2D images. For each corresponding feature identified in each set of 2D images, an orthographic projection model is applied, such that rays are projected through each point in the feature. The intersection points of the rays are plotted in a 3D image space. All of the 2D images are processed in the same manner, such that a resulting 3D image of a tumor is generated.

36 Claims, 14 Drawing Sheets

Related U.S. Application Data

(60) Provisional application No. 60/715,610, filed on Sep. 12, 2005.

(56) References Cited

U.S. PATENT DOCUMENTS

| | | |
|---|---|---|
| 2005/0215873 A1 | 9/2005 | Peter |
| 2005/0287072 A1* | 12/2005 | Contag ............... A01K 67/0275 424/9.6 |
| 2006/0222227 A1 | 10/2006 | Seul et al. |
| 2009/0148013 A1* | 6/2009 | Metaxas ................ G06T 7/0075 382/128 |
| 2010/0134487 A1* | 6/2010 | Lai ........................... G06T 17/00 345/419 |
| 2013/0048875 A1* | 2/2013 | Yamaguchi ........ G01N 15/1456 250/459.1 |
| 2013/0058979 A1* | 3/2013 | Zeng ...................... C07K 16/32 424/277.1 |
| 2015/0082468 A1* | 3/2015 | Bhatia .................. C12N 5/0012 800/9 |

OTHER PUBLICATIONS

PCT International Search Report mailed Mar. 27, 2007, in connection with International Publication No. WO 2007/032940 A2 (4 pages).

PCT Written Opinion mailed Mar. 27, 2007, in connection with International Publication No. WO 2007/032940 A2 (3 pages).

PCT International Preliminary Report on Patentability mailed Mar. 18, 2008, in connection with International Publication No. WO 2007/032940 A2 (1 page).

Huang, et al., "Recovering 3D Tumor Locations from 2D Bioluminescence Images," Fourth Annual Meeting of the Society for Molecular Imaging, Sep. 7-10, 2005 (9 pages).

Huang, et al., "3D Tumor Shape Reconstruction From 2D Bioluminescence Images," Biomedical Imaging: Nano to Macro, 2006, $3^{rd}$ IEEE International Symposium, Apr. 6-9, 2006 (4 pages).

Ayache, "Artificial Vision for Mobile Robots: Stereo Vision and Multisensory Perception," MIT Press, Cambridge, (MA), 1991 (345 pages).

Can, et al.,"A Feature-Based, Robust, Hierachical Algorithm for Registering Pairs of Images of the Curved Human Retina," IEEE Transactions on Pattern Analysis and Machine Intelligence, vol. 24, No. 3, Mar. 2002, pp. 347-364 (18 pages).

Gu, et al., "Three-Dimensional Bioluminescence Tomography With Model-Based Reconstruction," Optics Express, vol. 12, No. 17. Aug. 23, 2004, pp. 3996-4000 (5 pages).

Bar, et al., "Molecular Imaging of the Skeleton: Quantitative Real-Time Bioluminescence Monitoring Gene Expression in Bone Repair and Development," Journal of Bone and Mineral Research, vol. 18, No. 3 (2003) (9 pages).

Maes, et al., "Multimodality Image Registration by Maximization of Mutual Information," IEEE Transactions on Medical Imaging, vol. 16, No. 2, Apr. 1997, pp. 187-198 (12 pages).

Marr, et al., "A Computational Therory of Human Stereo Vision," Proceedings of the Royal Society of London, Series B, Biological Sciences, vol. 204, No. 1156, May 23, 1979, pp. 301-328 (28 pages).

Thirion, "New Feature Points Based on Geometric Invariants for 3D Image Registration," International Journal of Computer Vision, vol. 18, No. 2 (1996), pp. 121-137 (17 pages).

Viola, et al., "Alignment by Maximization of Mutual Information," International Journal of Computer Vision, vol. 24, No. 2, (1997), pp. 137-154 (18 pages).

Wang, et al., "Uniqueness Theorems in Bioluminescence Tomography," Med. Phys., vol. 31, No. 8, Aug. 2004, pp. 2289-2299 (11 pages).

Zhang, et al., "Iterative Point Matching for Registration of Free-Form Curves and Surfaces," International Journal of Computer Vision, vol. 13, No. 2, (1994), pp. 119-152 (34 pages).

Mayer-Kuckuk, et al., "Role of Reporter Gene Imaging in Molecular and Cellular Biology," Biol. Chem., vol. 385, pp. 353-361, May 2004 (9 pages).

Laurentini, "The Visual Hull Concept for Silhouette-Based Image Understanding," IEEE Transactions on Pattern Analysis and Machine Intelligence, vol. 16, No. 2, Feb. 1994 (13 pages).

Brand, et al., "Algebraic Solution for the Visual Hull," Proceedings of the 2004 IEEE Computer Society Conference on Computer Vision and Pattern Recognition, (2004) (6 pages).

Collignon, et al., "Automated Multi-Modality Image Registration Based on Information Theory," Information Processing in Medical Imaging, (1995) pp. 263-274 (12 pages).

Matsuik, et al., "Image-Based Visual Hulls," Computer Graphics Proceedings, Annual Conference Series (2000), pp. 369-374 (6 pages).

Kutulakos, et al., "A Theory of Shape by Space Carving," International Journal of Computer Vision, 38 (3), (2000), pp. 199-218 (20 pages).

Wang, et al., "Development of the First Bioluminescent CT Scanner," Radiology, 229 (P): 566 (2003) (2 pages).

Notice of Allowance dated Mar. 20, 2012 from U.S. Appl. No. 12/065,980 (4 pages).

* cited by examiner

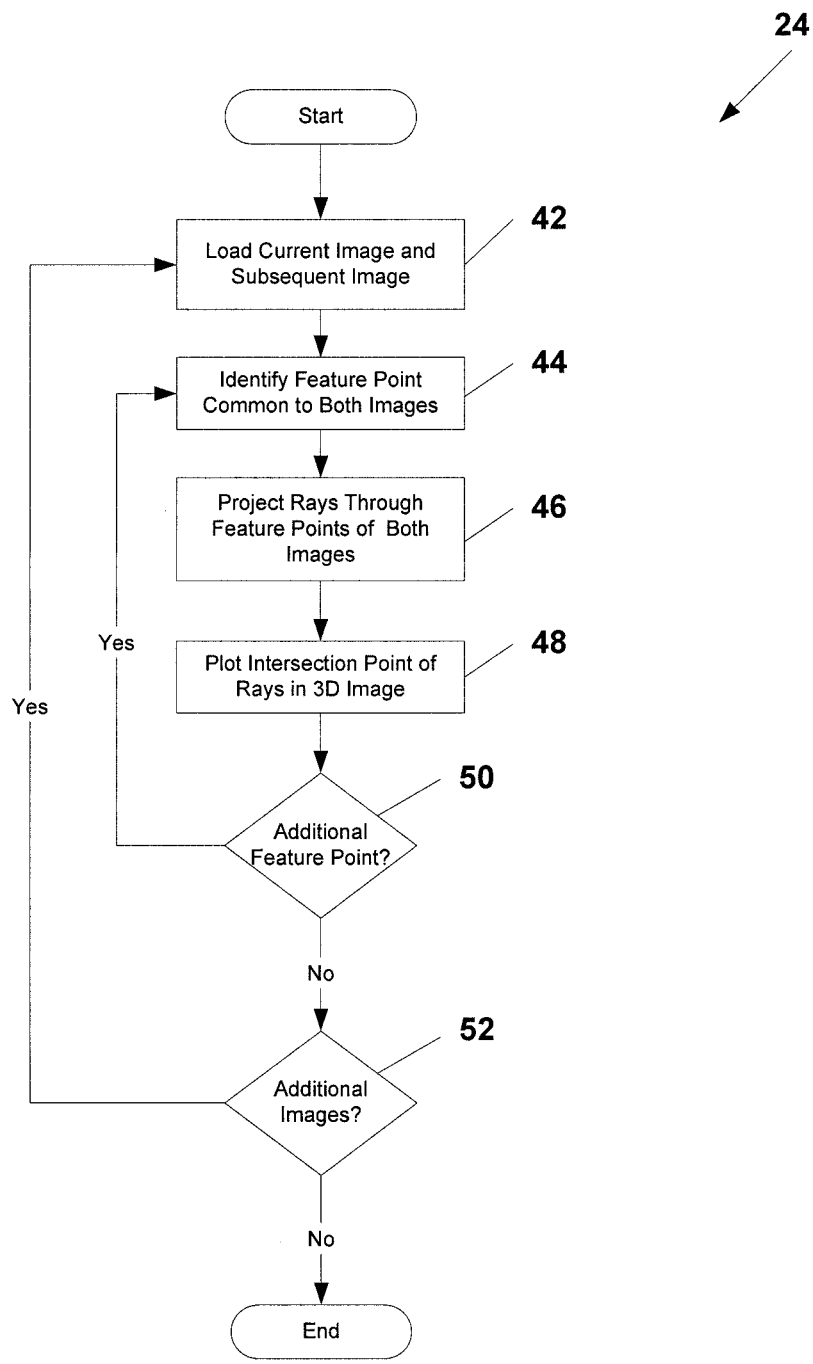

SYSTEM AND METHOD FOR GENERATING THREE-DIMENSIONAL IMAGES FROM TWO-DIMENSIONAL BIOLUMINESCENCE IMAGES AND VISUALIZING TUMOR SHAPES AND LOCATIONS

RELATED APPLICATIONS

This application is a continuation application of and claims the benefit of priority to U.S. patent application Ser. No. 12/065,980 filed Oct. 9, 2008, now U.S. Pat. No. 8,218,836, which is a U.S. National Phase Application under 35 U.S.C. 371 of International Application No. PCT/US06/34320 filed Aug. 31, 2006, which claims the benefit of U.S. Provisional Application Ser. No. 60/715,610 filed Sep. 12, 2005, the entire disclosures of which are expressly incorporated herein by reference.

BACKGROUND OF THE INVENTION

Field of the Invention

The present invention relates to the generation of three-dimensional images, and more particularly, to a system and methods for generating three-dimensional images from two-dimensional bioluminescence images and visualizing tumor shapes and locations.

Related Art

Bioluminescence imaging (BLI) is an emerging technique for sensitive and non-invasive imaging, which can be used for monitoring molecular events in living animals. Important applications of this imaging technique include gene therapy and cell trafficking studies. Unlike fluorescence-based optical imaging approaches which require an external source of light for excitation of fluorophores, BLI generates a two-dimensional (2D) view of gene expressions using a charge-coupled device (CCD) camera to detect the internal light produced by luciferases (catalysts in light generating reactions) through the oxidation of an enzyme-specific substrate (luciferin). The increasing use of BLI as a preferred modality for imaging small animals is due, in large part, to the need for repeatedly imaging animals that have been transplanted with gene-marked cells. Other imaging modalities, such as positron emission tomography (PET) and magnetic resonance imaging (MRI), are unsuitable for repeated and rapid imaging in laboratory settings.

Recent research activities have focused on bioluminescence tomography (BLT) in an effort to extract depth information from 2D bioluminescence images. Such efforts, however, have been largely ineffective in generating useful 3D images with high resolution. The use of multiple CCD cameras to measure bioluminescence signals has been suggested, but this approach is expensive and requires careful calibration of multiple cameras. As such, although BLI is a useful imaging modality for generating 2D images, there currently is no practical technique for rapidly generating three-dimensional (3D) images from a series of 2D BLI images.

In addition to the aforementioned limitations, existing BLI techniques do not allow for the rapid and accurate visualization of the physical shape and location of a tumor in a subject, in three dimensions. While there has been extensive research on multi-modal image registration in the image processing literature (based on matching geometric features or the optimization of intensity-based energy functions), no practical, 3D visualization approach for BLI images has been developed. Moreover, images generated by existing BLI techniques cannot be easily registered with 3D images generated by other imaging modalities (such as computed tomography (CT) and microCT) so that the physical shape and location of a tumor can be quickly discerned.

Accordingly, what would be desirable, but has not yet been provided, is a system and methods for generating three-dimensional images from two-dimensional, bioluminescence images and visualizing tumor shapes and locations.

SUMMARY OF THE INVENTION

The present invention relates to a system and methods for reconstructing 3D images from 2D bioluminescent images and visualizing tumor shapes and locations. A plurality of 2D bioluminescent images of a subject are acquired using any suitable bioluminescent imaging system. The 2D images are taken during a complete revolution about an axis of the subject, such that the imaging system is rotated about the subject by a predetermined angle between each image. Optionally, the imaging system could be held in a stationary position, the subject could be rotated through a complete revolution, and a plurality of images could be taken. After imaging, the 2D images are registered according to the rotation axis to align each image and to compensate for differences between adjacent images. After registration, corresponding features are identified between consecutive sets of 2D images. For each corresponding feature identified in each set of 2D images, an orthographic projection technique (or model) is applied, such that rays are projected through each point in the feature. The intersection points of the rays are plotted in a 3D image space. All of the 2D images are processed in the same manner, such that the resulting 3D image of a tumor is generated. The subject itself, as well as a container holding the subject, can also be rendered in the 3D image using the orthographic projection technique. The tumor can be registered with a reference image of the subject or an image of the container so that the precise shape and location of the tumor can be visualized, together with detailed anatomical structure information extracted from other imaging modalities such as microCT.

BRIEF DESCRIPTION OF THE DRAWINGS

Other important objects and features of the present invention will be apparent from the following Detailed Description of the Invention, taken in connection with the accompanying drawings, in which:

FIG. 6 is a flowchart showing processing step 24 of FIG. 1 in greater detail;

DETAILED DESCRIPTION OF THE INVENTION

The present invention relates to a system and methods for generating (or reconstructing) 3D images from 2D bioluminescent images and visualizing tumor locations. A plurality of 2D bioluminescent images of a subject are acquired during a complete revolution of an imaging system about a subject, using any suitable bioluminescent imaging system. After imaging, the 2D images are registered according to the rotation axis to align each image and to compensate for differences between adjacent images. After registration, corresponding features are identified between consecutive sets of 2D images. For each corresponding feature identified in each set of 2D images, an orthographic projection technique (or model) is applied, such that rays are projected through each point in the feature. The intersection points of the rays are plotted in a 3D image space. All of the 2D images are processed in the same manner, such that a resulting 3D image of a tumor is generated. The 3D image can be registered with a reference image of a subject or a container holding the subject, so that the precise location of the tumor can be visualized.

Figure 1:
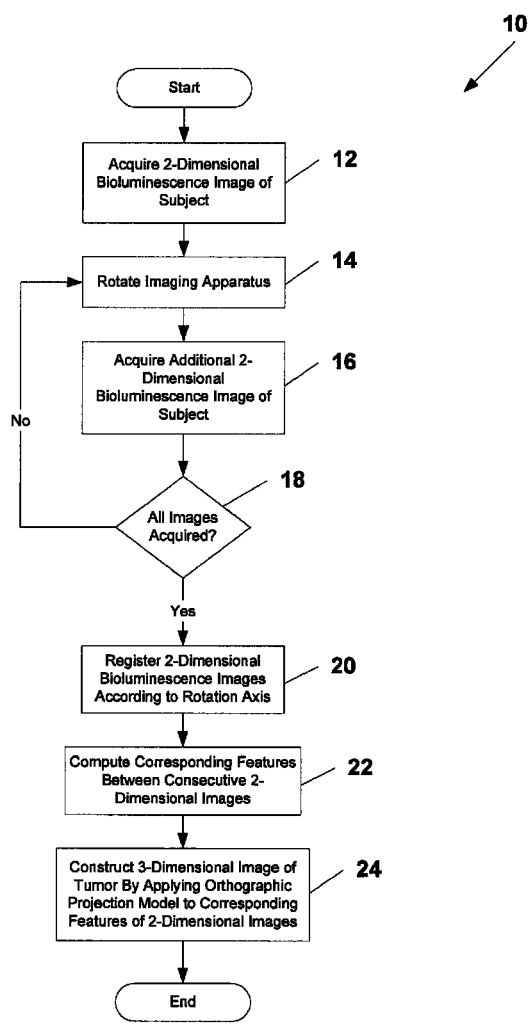
FIG. 1 is a flowchart showing the method of the present invention for generating 3D images from 2D bioluminescence images and visualizing tumor shapes and locations.

FIG. 1 is a flowchart showing the method of the present invention, indicated generally at 10, for visualizing 3D tumor locations from 2D bioluminescence images. Beginning in step 12, a 2D bioluminescence image of a subject is acquired. Preferably, the image is acquired using a suitable CCD-based bioluminescence imaging system, such as the IVIS Imaging System 100 Series or 200 Series manufactured by Xenogen, Inc. (Alameda, Calif.). The IVIS imaging system includes an ultra-low noise CCD camera, a low background imaging chamber, a six-position optical filter wheel, and high-efficiency optics. It should be noted that any suitable bioluminescence imaging system could be utilized. The subject could be a small animal or any other living organism.

In step 14, the imaging apparatus is rotated (i.e., moved along a circular path about an axis of the subject, such as the vertical axis) at a predetermined angle, while the subject is held in a stationary position. The angle of rotation could be adjusted as desired. It has been found that relatively small angles of rotation (e.g., 12 degrees) have been found to be sufficient. The rotation angle is small between consecutive image acquisitions so as to ensure the availability of accurate corresponding points in adjacent images, thereby facilitating stereo-like reconstruction of a 3D image. This configuration is simpler, more flexible, and less expensive than using multiple cameras, since any desired number of images can be acquired by adjusting the rotation angle. In step 16, an additional 2D bioluminescence image of the subject is taken, at the new position. In step 18, a determination is made as to whether additional images are to be acquired. If a positive determination is made, steps 14-18 are repeated. Preferably, a plurality of 2D bioluminescent images are taken over a complete revolution about an axis of the subject.

After all 2D images have been acquired, step 20 occurs, wherein the 2D images are registered according to the rotation axis. Due to noise and jittering of the image-capturing system during the rotation of the subject, the set of 2D images acquired in steps 12-18 may not be perfectly aligned. To correct for these errors, an image-based method for registering the images is applied, such that projections of the rotating axis on all images overlap in the image space. For this purpose, an image dissimilarity objective function is defined based on mutual information, and the translation and rotation parameters for each image are recovered by minimizing the objective function. Suppose a source image is identified as f, and its adjacent target image is g. In the most general case, consider a sample domain $\Omega$ in the image domain of the source image f. The objective is to recover the parameters $\Theta=(T_x, T_y, \theta)$ of a global transformation A such that the mutual information between $f\Omega=f(\Omega)$ and $g_\Omega{}^A=g(A(\Theta;\Omega))$ is maximized. Here the parameters $T_x$ and $T_y$ are translation parameters in the x and y directions respectively, and $\theta$ denotes the rotation angle. The definition for such mutual information can be expressed by the following equation:

$$MI(X^{f\Omega}, X^{g\Omega^A}) = H[X^{f\Omega}] + H[X^{g\Omega^A}] - H[X^{f\Omega,g\Omega^A}] \qquad (1)$$

In the equation above, X denotes the intensity random variable and H represents the differential entropy. The image dissimilarity objective function can then be defined as:

$$E(A(\Theta)) = -MI(X^{f\Omega}, X^{g\Omega^A}) \qquad (2)$$

By minimizing the objective function E, the maximization of mutual information is achieved. The calculus of variations with a gradient descent method is then used to minimize E and to recover the transformation parameters $T_x$, $T_y$ and $\theta$.

After registration of all images in step 20, step 22 occurs, wherein corresponding features between consecutive 2D bioluminescence images are computed. Then, in step 24, a 3D image of a tumor (or other feature of the subject being studied) is constructed by applying an orthographic projection model to the corresponding features of the 2D images identified in step 22. The 3D image provides a detailed and accurate representation of the tumor. The 3D image can be registered with another image of the subject, such as a microCT image or a bioluminescence image of the subject, so that the precise physical location of the tumor can be visualized.

Figure 2A:
FIGS. 2A-2C are photographs of 2D bioluminescence images of an animal.
Figure 2B:
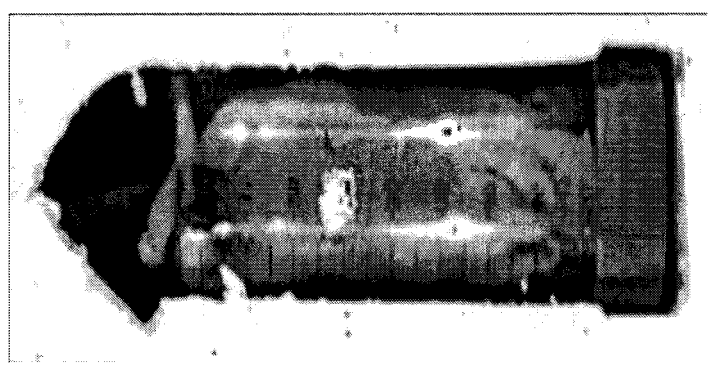
Figure 2C:
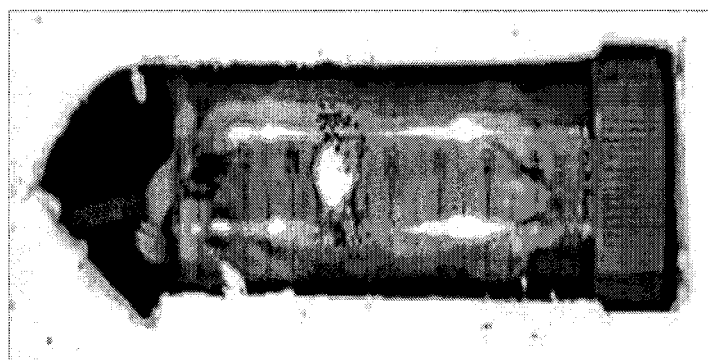

FIGS. 2A-2C are photographs of 2D bioluminescence images of a small animal (a mouse) having a tumor in the abdomen. The images were acquired using steps 12-18 of FIG. 1. The bioluminescence images were acquired following injection of D-luciferin (given i.p. at 150 mg/ml) and using the IVIS imaging system. Images were acquired in a standard mode with 2×2 binning. In order to achieve specificity of the response in the z-axis, an experimental configuration was tested. The animal to be imaged was inserted into a cylindrical 50 ml tube cut at both ends, which can be rotated by a small angle (12 degrees) about the vertical axis of the tube. Images were acquired at every rotation stage clockwise from the vertical axis. This generated a series of images including the original image prior to any rotation. For small animals such as mice, a 50 ml tube cut at both ends and at the bottom can be used as a holder. The anesthetized animal fits easily in the tube and can be placed in the imaging device without any discomfort. The animal can be rotated and 36 images can be acquired. An added advantage of the 50 ml tube is that it can be fitted with a soft foam to make the animal fit snugly into the tube, and the outside of the tube can be marked with fiduciary markers for anatomical reference.

The images shown in FIGS. 2A-2C were generated after each small angle (e.g., 12 degrees) rotation. The intensity representation denotes the level of response in different locations. The bright reflections (due to the tube surface) were eliminated using a pre-processing filtration step before applying the method of the present invention. It should be noted that the camera could also be held stationary, and the subject rotated as necessary. The tumor regions have higher intensity values in the BLI images. The dimensions along the long axis and short axis of the mouse tumor were 1:2 cm, 1:1 cm and 1:1 cm. The imaging period lasted approximately 20 minutes after injection of D-luciferin.

Figure 3A:
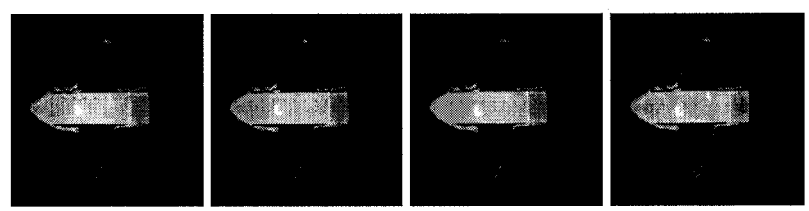
FIG. 3A shows photographs of 2D bioluminescence images prior to image registration by the preset invention.
Figure 3B:
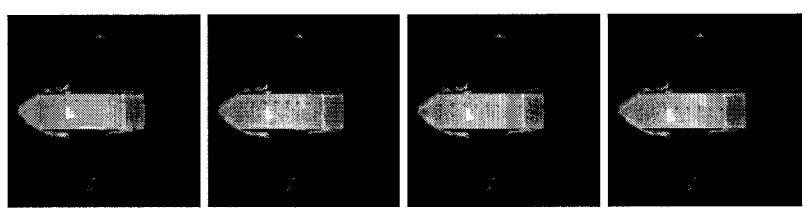
FIG. 3B shows the photographs of FIG. 3A after image registration by the present invention.

FIG. 3A shows photographs of 2D bioluminescence images prior to image registration performed by step 20 of FIG. 1. These images were generated in a phantom study, wherein lysates from cells transduced with a mammalian expression vector containing luciferase were embedded in agarose plugs and incubated with the substrate D-luciferin inside a tube containing 1% agarose in Tris Acetate EDTA buffer of pH 7.5. The images shown in FIG. 3A were generated after each successive rotation of the camera of approximately 11.25 degrees, and are slightly skewed. After registration by the present invention, the images are properly aligned, as shown in FIG. 3B.

Figure 4:
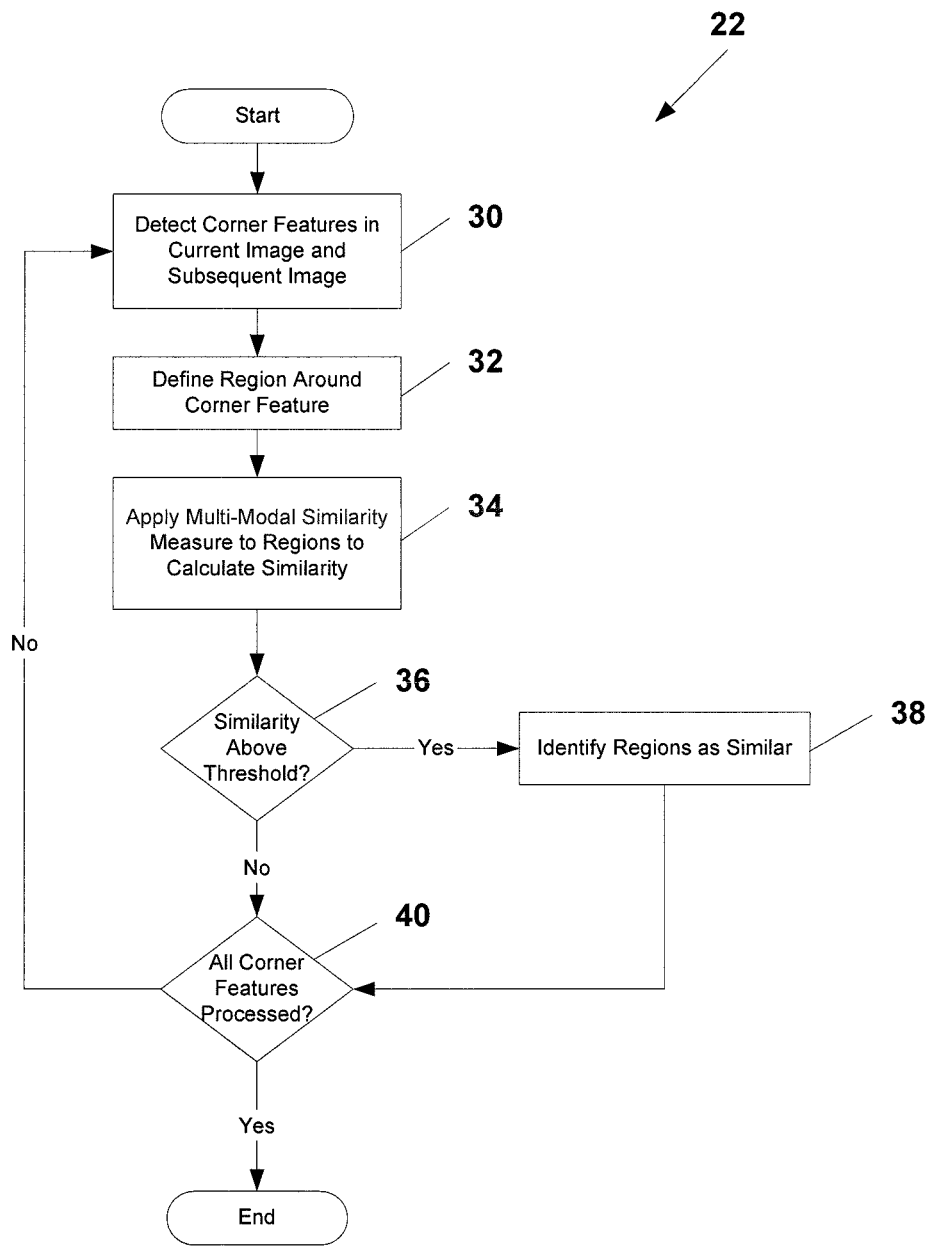
FIG. 4 is a flowchart showing processing step 22 of FIG. 1 in greater detail.

FIG. 4 is a flowchart showing processing step 22 of FIG. 1 in greater detail. In step 22, corresponding features between successive images are identified. In step 30, corner features on an image I are detected. This is achieved using the spatial image gradient (i.e. first order derivatives), [Ix, Iy]. For a neighborhood Q surrounding a pixel p, a matrix C is formed, defined as:

$$C = \begin{pmatrix} \sum I_x^2 & \sum I_x I_y \\ \sum I_x I_y & \sum I_y^2 \end{pmatrix} \quad (3)$$

where the sums are taken over the neighborhood Q. Then, principal component analysis is applied to compute the two eigenvalues $\lambda 1$ and $\lambda 2$ ($\lambda 1 \geq \lambda 2$) of the matrix C, and corner features are identified as those neighborhoods where $\lambda 1 \geq \lambda 2 > 0$ and the smaller eigenvalue $\lambda 2$ is larger than a threshold. Then, in step 32, regions around the corner features are defined, and in step 34, a multi-modal similarity measure is applied to calculate similarities in the regions. Such a measure is utilized because nonlinear changes exist in feature appearances due to planar projection after rotation.

In step 36, a determination is made as to whether the measured similarity is above a threshold. If a positive determination is made, the regions are identified in step 38 as being similar. Then, in step 40, a determination is made as to whether all corner features have been processed. If a negative determination is made, step 30 is re-invoked, so that additional corner features can be processed.

Figure 5A:
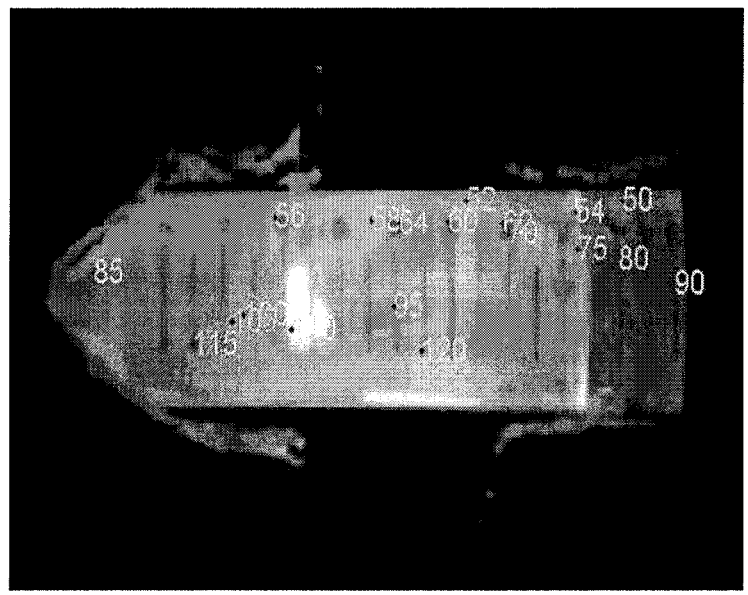
FIGS. 5A-5b are photographs showing corresponding features identified by the present invention in two, sequential, 2D bioluminescent images.
Figure 5B:
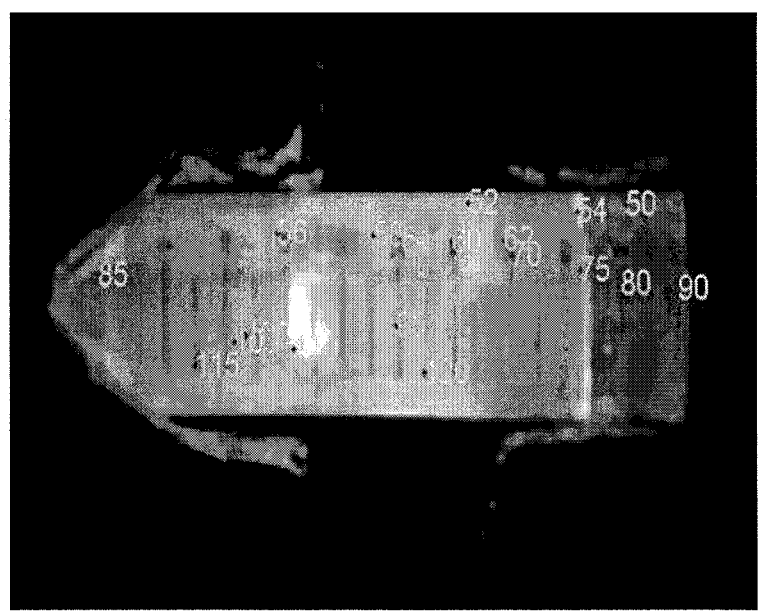

FIGS. 5A-5b are photographs showing corresponding features identified by the present invention in two, sequential, 2D bioluminescent images. The numbers in the images identify corresponding features that have been calculated by the present invention. The image shown in FIG. 5B was taken at a rotation angle of 11.5 degrees from the image shown in FIG. 5A.

FIG. 6 is a flowchart showing processing step 24 of FIG. 1 in greater detail. In step 24, a 3D image of a tumor is constructed by applying an orthographic projection model to the corresponding features identified in step 22 of FIG. 1. In step 42, the current 2D image and a subsequent 2D image are loaded. Then, in step 44, a feature point common to both images (e.g., a pixel within a corresponding feature common to both images and identified in step 22) is identified. Then, in step 46, rays are projected through the feature points of both images. In step 48, the point of intersection of both rays is plotted in a 3D image space. The ray projection technique can be implemented in any suitable digital computer system, using known techniques that are similar to ray tracing techniques implemented in computer graphics.

In step 50, a determination is made as to whether additional feature points exist. If a positive determination is made, steps 44-50 are repeated. If a negative determination is made, step 52 is invoked, wherein a determination is made as to whether additional images are to be processed. If a positive determination is made, steps 42-50 are re-invoked. In this manner, all feature points for all images are plotted in the 3D image space. The resulting 3D image is a high-resolution visualization of one or more tumors in the subject. This rendering approach is equivalent to having multiple cameras surrounding a static object. However, it is much simpler and does not require the calibration of multiple cameras.

Figure 7A:
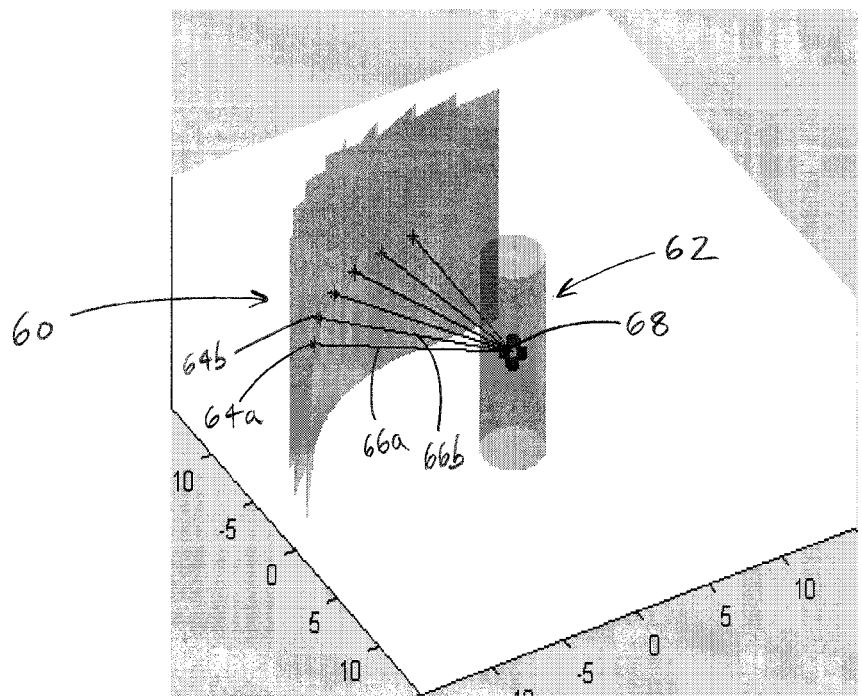
FIGS. 7A-7B are diagrams illustrating the orthographic projection model implemented by the present invention for rendering a 3D image.
Figure 7B:
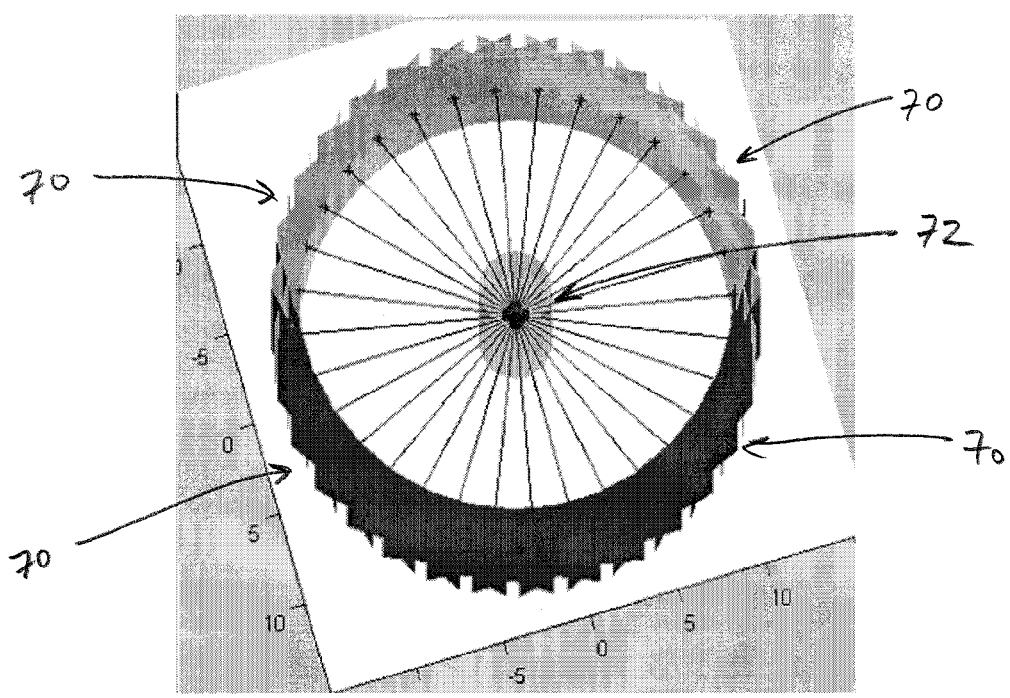

FIGS. 7A-7B are diagrams illustrating the orthographic projection model implemented by the method of the present invention for rendering a 3D image. As shown in FIG. 7A, a series of 2D bioluminescent images 60 that have been processed in accordance with the present invention (i.e., to register the images and to identify corresponding features in adjacent images) are used to plot one or more features 68 in a common volume 62 of a 3D image space. For points in each common feature, such as points 64a and 64b, rays, such as rays 66a and 66b are projected through the points. The intersection of the rays 66a and 66b is plotted in the common volume 62. As shown in FIG. 7B, this process is repeated for each point of each common feature of each 2D image 70, about the entire circumference of the common volume 72. The resulting 3D image in the common volume 72 represents a visualization of the tumor in the subject. It should be noted that this technique could be implemented to visualize any desired feature of the subject.

Figure 8A:
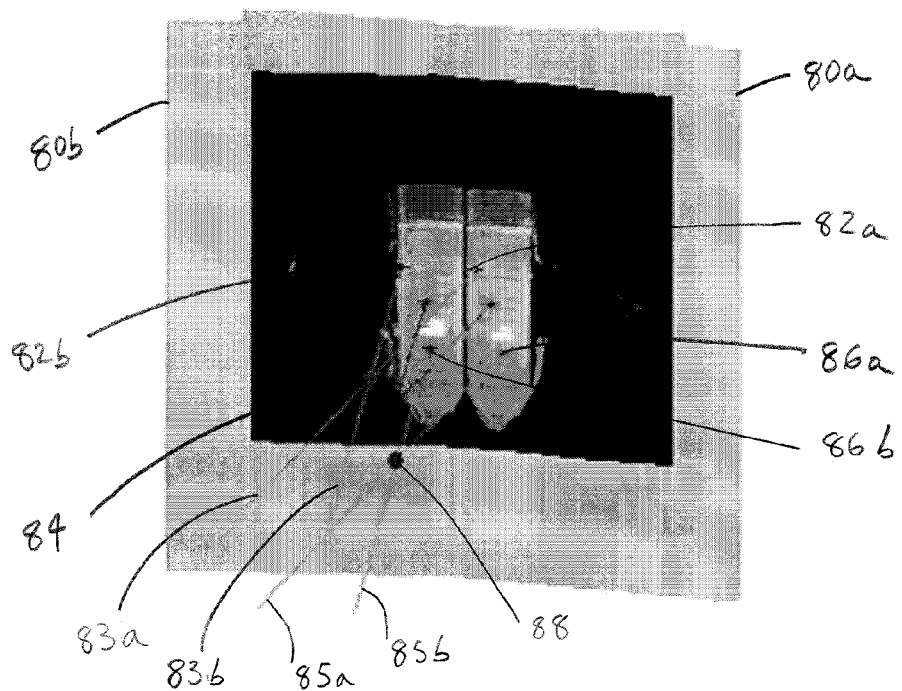
FIGS. 8A-8B are diagrams illustrating the orthographic projection model of the present invention in greater detail.
Figure 8B:
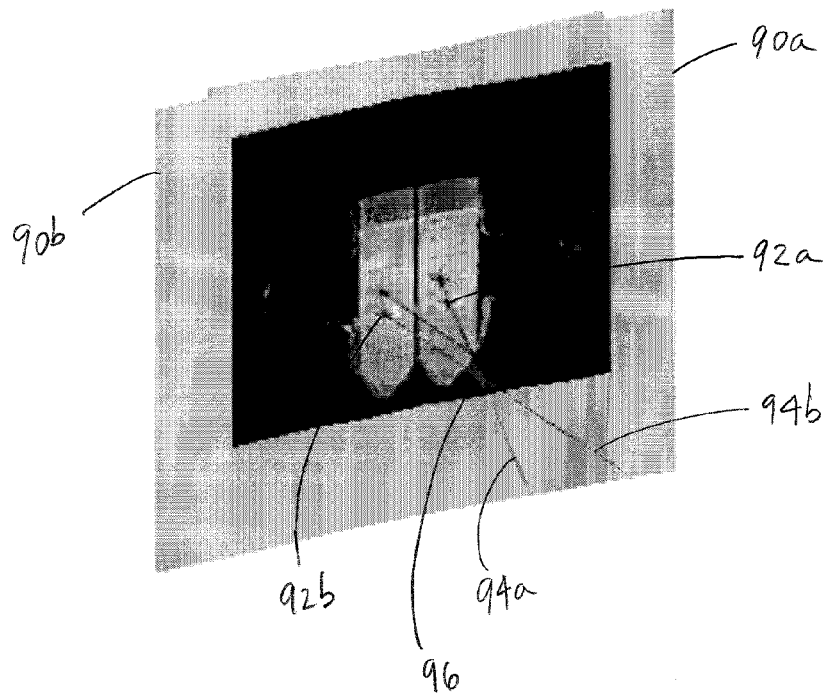

FIGS. 8A-8B are diagrams illustrating the orthographic projection model of the present invention in greater detail. In FIG. 8A, two consecutive 2D images 80a and 80b are shown. Points 82a and 82b in the images correspond to locations on the tube containing the subject. Points 86a and 86b correspond to locations of the tube center. To determine the 3D location of these points, rays 83a and 83b are projected through points 82a and 82b, respectively. The intersection point 84 of the rays 83a and 83b corresponds to the 3D location of the points 82a and 82b of the images 80a and 80b. Similarly, rays 85a and 85 are projected through the points 86a and 86b, respectively. The intersection point 88 corresponds to the 3D location of the points 86a and 86. Using this technique, a 3D image can be generated for any desired feature in the 2D images 80a and 80b. Thus, for example, not only can a tumor be imaged in 3 dimensions, but also the subject itself, any desired feature of the subject, or the container holding the subject. Advantageously, this allows for precise, 3D visualization of tumor locations with respect to the subject's anatomy.

FIG. 8B shows the orthographic projection technique of the present invention applied to generate a 3D image corresponding to the center of a tumor. Rays 94a and 94b are projected through tumor center locations 92a and 92b in the 2D images 90a and 90b, respectively. The intersection point 96 is mapped in a 3D image space, and corresponds to the location of the center of the tumor. The tumor center locations 92a and 92b in the 2D images 90a and 90b can be computed as the centroid of high-intensity signal regions in the images 90a and 90b.

Figure 9A:
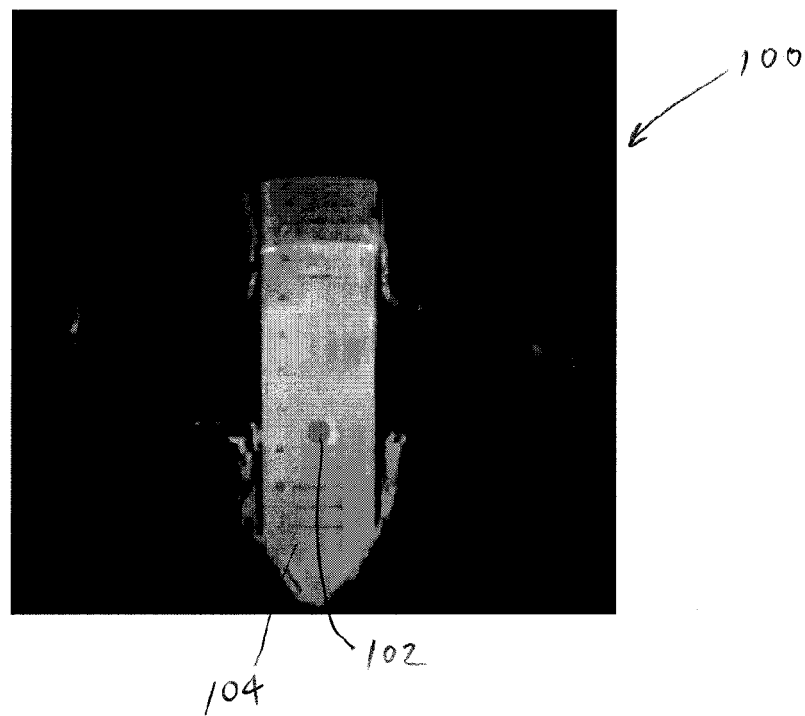
FIG. 9A is a front view of a 3D tumor visualization generated by the present invention and superimposed on a 2D bioluminescence image.
Figure 9B:
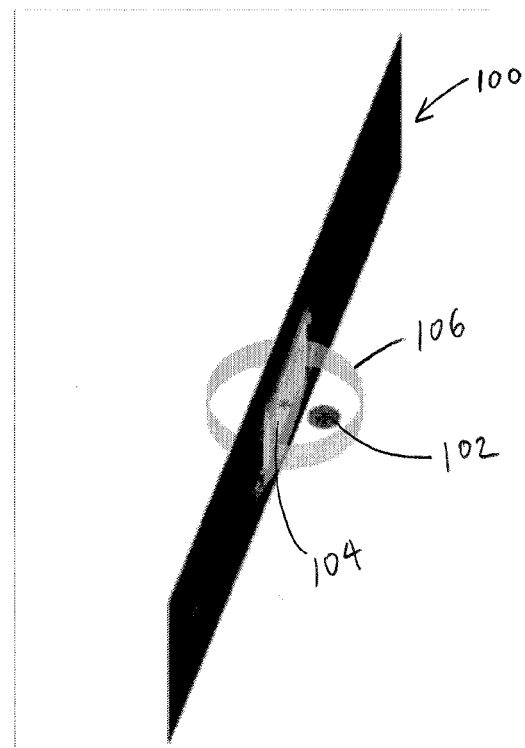
FIG. 9B is a perspective view of the 3D tumor visualization of FIG. 9A, shown with respect to the 2D bioluminescence image.

In the aforementioned phantom study, since the object surface can be approximated using a cylinder, it is possible to determine the radius of the cylinder using the recovered 3D points on the tube surface, and to render the surface as a cylinder. Then, a relationship is established between the reconstructed object dimension measurements in the object-centered reference frame and that in the physical world. This is achieved by computing the conversion ratio based on one base measurement, such as the diameter or the length of the tube (or the subject). Such an approximation is shown in FIG. 9A, which is a front view of a 3D visualization of a tumor 102 generated by the present invention and superimposed on a 2D bioluminescence image 100 of the subject 104. As shown in FIG. 9B, the visualization also includes a 3D rendering of a cylinder 106, which corresponds to the tube holding the subject.

In the phantom study mentioned above, validation of the 3D visualization generated by the present invention was achieved by comparing the visualized 3D location of the tumor center with images of the subject taken with a microCT scanner. For purposes of validation, the 3D visualization shown in FIGS. 9A-9B was compared to microCT images of the same subject. The 3D visualization generated by the present invention indicates that the tumor center location is within the tube containing the specimen. The microCT images confirmed that this visualization is accurate. Further, physical measurements indicated that the 3D distance between the true luciferase-positive cell lysates center and the visualized 3D center are within 2 mm of each other, thus indicating a high degree of accuracy.

Figure 10:
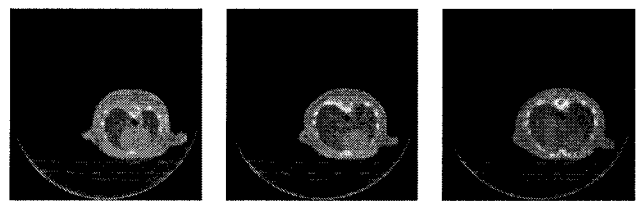
FIG. 10 shows photographs of microCT images of a mouse.
Figure 11A:
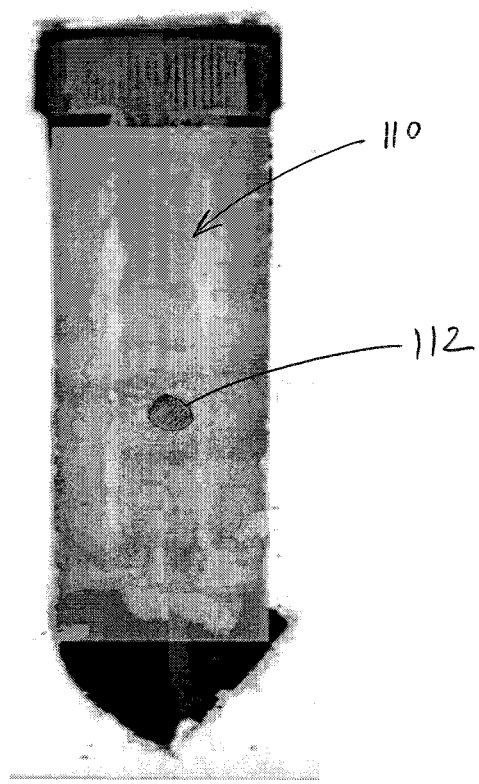
FIG. 11A is a front view of a 3D tumor visualization generated by the present invention and superimposed on a 2D bioluminescence image.
Figure 11B:
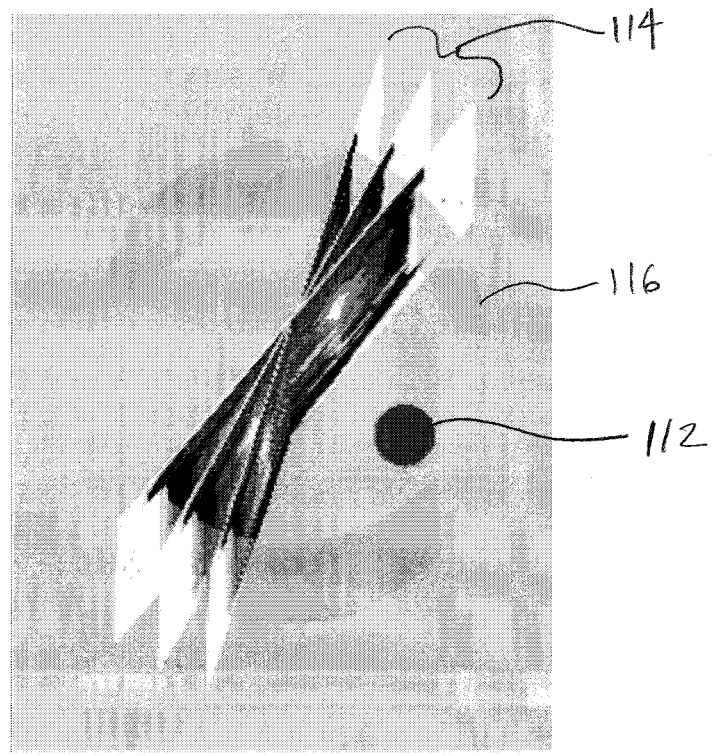
FIG. 11B is a perspective view of the 3D tumor visualization of FIG. 11A, shown with respect to the 2D bioluminescence image.
Figure 11C:
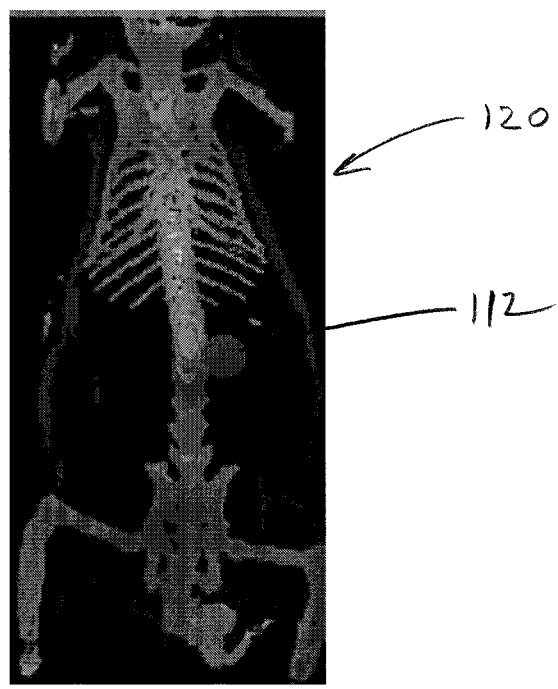
FIG. 11C is a front view showing the 3D tumor visualization of FIG. 11A superimposed on a microCT image of a mouse.

The present invention was also tested on a mouse to determine its feasibility for use in small animal tests, as well as to demonstrate the ability of the present invention to register the 3D visualization with a microCT image of an animal. The results of this test are illustrated in FIGS. 10 and 11A-11C. In preparation for the test, the mouse was anesthetized with isoflurane inhalation, injected with 150 mg/kg of D-luciferin, and immobilized in an open 50 ml tube and placed on the imaging stage of the IVIS imaging system. The mouse was then imaged, and examples of the resulting BLI images are shown in FIG. 2. The mouse was then carried over to the microCT machine, in the same position while remaining under isoflurane anesthesia. FIG. 10 shows microCT images of the mouse. The present invention was then applied to the BLI images, resulting in the 3D visualizations shown in FIGS. 11A-11B. In FIG. 11A, a front view of the visualized tumor 112 is shown superimposed on a single BLI image 110 of the mouse. In FIG. 11B, the visualized tumor 112 is shown in perspective view, within the visualized cylinder 116 corresponding to the tube holding the mouse. A plurality of 2D BLI images 114 are shown for reference. Then, as shown in FIG. 11C, the visualized tumor 112 was superimposed on a single microCT image 120 of the mouse. The visualized tumor 112 was thus registered with the microCT image, resulting in a highly accurate indication of the physical location of the tumor inside the mouse's body. Registration with the microCT image can be achieved using landmark information and an Interative Closest Point (ICP) technique, or any other suitable technique. Repeated imaging of the a subject over time can also be performed, so that temporal information can be visualized (e.g., to show changes in anatomical structures over time).

Figure 12A:
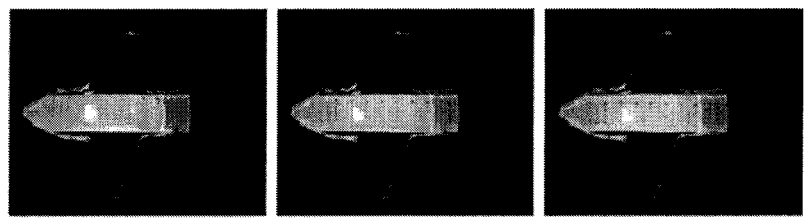
FIGS. 12A-12C are photographs showing a segmentation technique applied to 2D bioluminescence images for highlighting desired regions of the images.
Figure 12B:
Figure 12C:
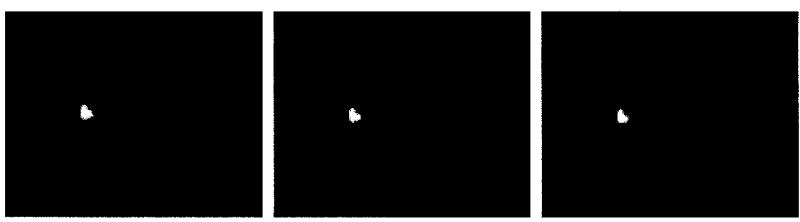

FIGS. 12A-12C are photographs showing a segmentation technique applied to 2D bioluminescence images for highlighting desired regions of the images. Segmenting the image to highlight desired portions has been found to particularly useful where the orthographic projection technique of the present invention is implemented using visual hulls, since the visual hull technique depends both on object silhouettes and on the camera viewing direction. FIG. 12A shows the original 2D BLI images. In order to facilitate correct segmentation, a monochromatic background was captured to distinguish the tube containing the small animal from the environment in the experiment setup. First, the contour (or silhouette) of the tube containing the small animal was extracted from the input images by simple thresholding. FIG. 12B shows the tube segmentation result that were obtained. Then, according to the characteristic of tumor in the BLI images (which appear as higher intensities), the tumor was then segmented from the tube region by combining tumor intensity and edge information. FIG. 12C shows segmentation results of the tumor in the images.

Figure 13:
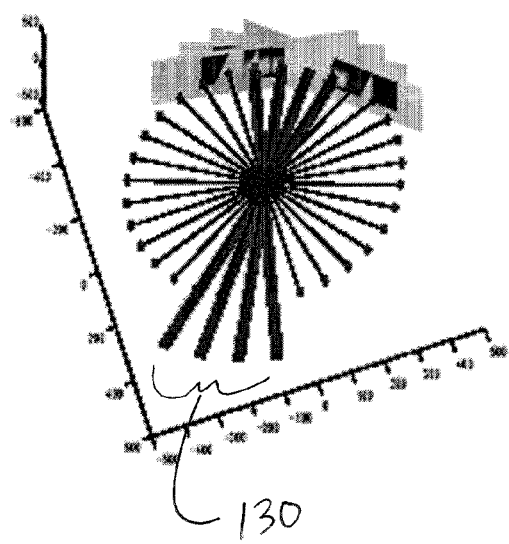
FIG. 13 is a diagram illustrating the orthographic projection technique of the present invention implemented using visual hulls.

FIG. 13 is a diagram illustrating the orthographic projection technique of the present invention implemented using visual hulls. Formally defined, the visual hull of an object S with respect to the viewing region R, denoted by V H(S;R), is a volume in space such that for each point P in V H(S;R) and each viewpoint V in R, the half-line from V through P contains at least one point of S. This definition states that the visual hull consists of all points in space whose images lie within all silhouettes viewed from the viewing region. Stated another way, the visual hull is the maximal object that has the same silhouettes as the original object, as viewed from the viewing region. In the present invention, the segmented object and tumor silhouettes are projected into the 3D space by cylindrical visual hulls, illustratively indicated by reference numeral 130 in FIG. 13. By computing the intersection of the visual hulls projected from all images (i.e., all viewing directions), an estimation of the shape and location of the animal and its interior tumors can be obtained.

Figure 14A:
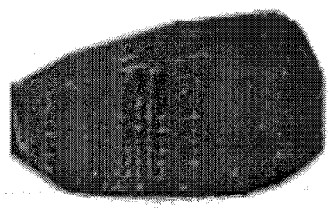
FIGS. 14A-14B are sample images of 3D tumor visualizations generated by the present invention.
Figure 14B:
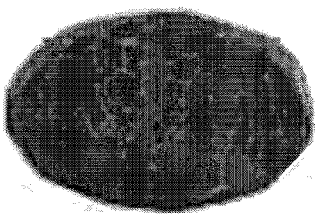

FIGS. 14A-14B are sample images of 3D tumor visualizations generated by the present invention. As can be appreciated, tumors of various shapes and sizes can be visualized.

Figure 15A:
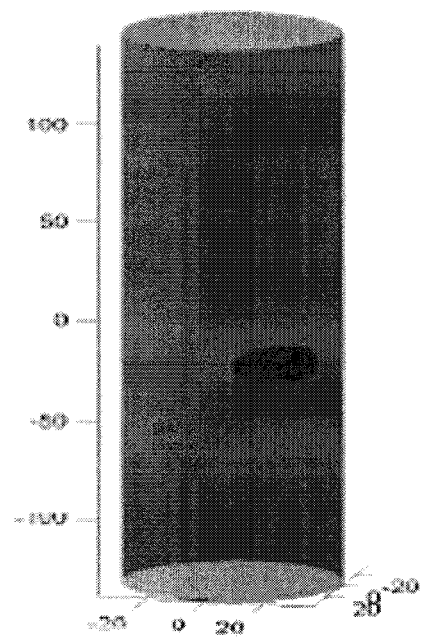
FIGS. 15A-15B are sample images of 3D tumor and specimen container visualizations generated by the present invention.
Figure 15B:
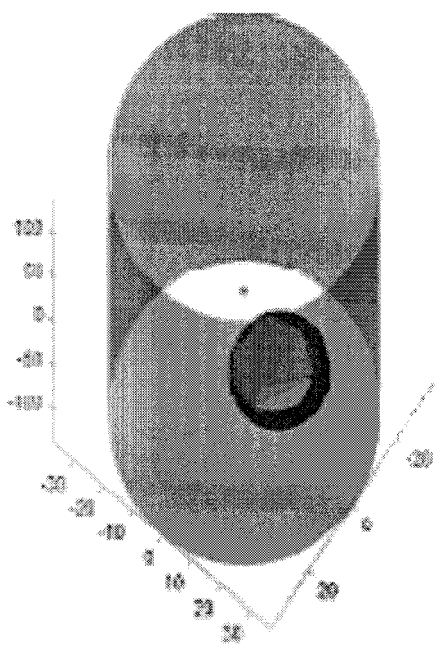

FIGS. 15A-15B are sample images of 3D tumor and specimen container visualizations generated by the present invention. By visualizing both the tumor and the entire container, the position of the tumor with respect to the longitudinal axis of the container can be visualized, as well as the approximate distance between the tumor and the container wall.

To implement the invention, the following hardware could be used: bioluminescence imaging hardware, which could include any bioluminescence imaging system with upgrades to allow for rotation of the subject being imaged or rotation of the camera of the imaging system about the subject; a microCT scanner to acquire microCT images of the subject; and suitable computer hardware, such as high-end computer workstations, for data processing, rendering, and visualization. Computer software that could be utilized to implement the methods of the present invention includes, but is not limited to, Matlab, Microsoft Visual Studio, and computer graphics libraries. Such software could be utilized to process the BLI, microCT, and ground truth annotation data, as well as to visualize the co-registration and reconstructed tumor volume results.

It is conceivable that software coded to carry out the method of the present invention could be integrated for use with any commercially-available bioluminescent imaging system (or other imaging system), to provide a complete, 3D visualization system. Moreover, the method of the present invention can be extended to register the center of mass of several areas near the maximum response regions of images, where the intensity is 5-10% lower from this maximum, so as to provide an estimate of the tumor enclosing volume. The present invention has multiple applications, such as the study of cell trafficking, tumor growth, in vivo patient response to therapy, studies relating to hematological reconstitution following bone marrow transplantation, and other applications.

Having thus described the invention in detail, it is to be understood that the foregoing description is not intended to limit the spirit and scope thereof. What is desired to be protected by Letters Patent is set forth in the following claims.

What is claimed is:

1. A method for generating a three dimensional image from a plurality of two-dimensional bioluminescence images, comprising:
   acquiring a plurality of two-dimensional bioluminescence images using an imaging system;
   processing the plurality of two-dimensional bioluminescence images so that adjacent images are aligned with each other;
   identifying at least one feature common to each of the plurality of two-dimensional bioluminescence images; and
   applying an orthographic projection model to the at least one feature of each of the plurality of two-dimensional bioluminescence images to generate a three-dimensional image of the at least one feature.

2. The method of claim 1, wherein the step of acquiring the plurality of two-dimensional bioluminescence images comprises taking a first two-dimensional bioluminescence image of a subject at a first location using an imaging system.

3. The method of claim 2, further comprising rotating a subject at a predetermined angle and taking a second two-dimensional image of a subject.

4. The method of claim 1, wherein the step of applying the orthographic projection model to the at least one feature comprises identifying feature points in the plurality of two-dimensional bioluminescence images corresponding to the at least one feature.

5. The method of claim 4, further comprising projecting rays through the feature points.

6. The method of claim 5, further comprising plotting an intersection point of the rays in the three-dimensional image.

7. The method of claim 4, further comprising projecting visual hulls through the feature points.

8. The method of claim 7, further comprising plotting an intersection point of the visual hulls in the three-dimensional image.

9. The method of claim 1, further comprising registering the three-dimensional image with a reference image to visualize a location of the at least one feature.

10. A system for generating a three-dimensional image from a plurality of two-dimensional bioluminescence images, comprising:
    an imaging system for acquiring a plurality of two-dimensional bioluminescence images;
    means for processing the plurality of two-dimensional bioluminescence images so that adjacent images are aligned with each other;
    means for identifying at least one feature common to each of the plurality of two-dimensional bioluminescence images; and
    an orthographic projection model applied to the at least one feature of each of the plurality of two-dimensional bioluminescence images to generate a three-dimensional image of the at least one feature.

11. The system of claim 10, wherein the imaging system acquires a first two-dimensional bioluminescence image of a subject at a first location.

12. The system of claim 11, wherein the imaging system rotates a subject at a predetermined angle and acquires a second two-dimensional bioluminescence image of a subject.

13. The system of claim 10, wherein the orthographic projection model identifies feature points in the plurality of two-dimensional bioluminescence images corresponding to the at least one feature.

14. The system of claim 13, wherein the orthographic projection model projects rays through the feature points.

15. The system of claim 14, wherein the orthographic projection model plots an intersection point of the rays in the three-dimensional image.

16. The system of claim 13, wherein the orthographic projection model projects visual hulls through the feature points.

17. The system of claim 16, wherein the orthographic projection model plots an intersection point of the visual hulls in the three-dimensional image.

18. The system of claim 10, further comprising means for registering the three dimensional image with a reference image to visualize a location of the at least one feature.

19. A method for visualizing a three-dimensional tumor location, comprising:
    acquiring a plurality of two-dimensional bioluminescence images of a tumor using an imaging system;
    processing the plurality of two-dimensional bioluminescence images so that adjacent images are aligned with each other;
    identifying at least one feature common to each of the plurality of two-dimensional bioluminescence images;
    applying an orthographic projection model to the at least one feature of each of the plurality of two-dimensional bioluminescence images to generate a three-dimensional image of the tumor; and
    registering the three-dimensional image with a reference image to visualize a location of the tumor.

20. The method of claim 19, wherein the step of acquiring the plurality of two-dimensional bioluminescence images comprises taking a first two-dimensional bioluminescence image of a subject at a first location using an imaging system.

21. The method of claim 20, further comprising rotating a subject at a predetermined angle and taking a second two-dimensional bioluminescence image of a subject.

22. The method of claim 19, wherein the step of applying the orthographic projection model to the at least one feature comprises identifying feature points in the plurality of two-dimensional bioluminescence images corresponding to the at least one feature.

23. The method of claim 22, further comprising projecting rays through the feature points.

24. The method of claim 23, further comprising plotting an intersection point of the rays in the three-dimensional image.

25. The method of claim 22, further comprising projecting visual hulls through the feature points.

26. The method of claim 25, further comprising plotting an intersection point of the visual hulls in the three-dimensional image.

27. The method of claim 19, further comprising segmenting specific features of the plurality of two-dimensional bioluminescence images.

28. A system for visualizing a three-dimensional tumor location, comprising:
an imaging system for acquiring a plurality of two-dimensional bioluminescence images of a tumor;
means for processing the plurality of two-dimensional bioluminescence images so that adjacent images are aligned with each other;
means for identifying at least one feature common to each of the plurality of two-dimensional bioluminescence images;
an orthographic projection model applied to the at least one feature of each of the plurality of two-dimensional bioluminescence images to generate a three-dimensional image of the tumor; and
means for registering the three-dimensional image with a reference image to visualize a location of the tumor.

29. The system of claim 28, wherein the imaging system acquires a first two-dimensional bioluminescence image of a subject at a first location.

30. The system of claim 28, wherein the imaging system rotates a subject at a predetermined angle and acquires a second two-dimensional bioluminescence image of a subject.

31. The system of claim 28, wherein the orthographic projection model identifies feature points in the plurality of two-dimensional bioluminescence images corresponding to the at least one feature.

32. The system of claim 31, wherein the orthographic projection model projects rays through the feature points.

33. The system of claim 32, wherein the orthographic projection model plots an intersection point of the rays in the three-dimensional image.

34. The system of claim 31, wherein the orthographic projection model projects visual hulls through the feature points.

35. The system of claim 34, wherein the orthographic projection model plots an intersection point of the visual hulls in the three-dimensional image.

36. The system of claim 33, further comprising means for segmenting specific features of the plurality of two-dimensional bioluminescence images.

* * * * *